(12) United States Patent
Nagasaka

(10) Patent No.: US 7,925,105 B2
(45) Date of Patent: Apr. 12, 2011

(54) IMAGE TRANSFER AND MOTION PICTURE CLIPPING PROCESS USING OUTLINE OF IMAGE

(75) Inventor: Fumio Nagasaka, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 1064 days.

(21) Appl. No.: 11/724,024

(22) Filed: Mar. 13, 2007

(65) Prior Publication Data

US 2007/0217700 A1    Sep. 20, 2007

(30) Foreign Application Priority Data

Mar. 14, 2006   (JP) ................................ 2006-068835
Mar. 14, 2006   (JP) ................................ 2006-068837

(51) Int. Cl.
  *G06K 9/36*   (2006.01)
  *G06K 9/46*   (2006.01)
(52) U.S. Cl. ...................... 382/236; 382/243; 348/400.1
(58) Field of Classification Search .................. 382/236, 382/243; 348/400.1–419.1
See application file for complete search history.

(56) References Cited

U.S. PATENT DOCUMENTS

| 3,987,412 | A | * | 10/1976 | Morrin, II | 382/242 |
| 4,124,871 | A | * | 11/1978 | Morrin, II | 358/444 |
| 5,647,024 | A | * | 7/1997 | Kawauchi et al. | 382/232 |
| 5,710,590 | A | * | 1/1998 | Ichige et al. | 348/14.01 |
| 6,167,155 | A | * | 12/2000 | Kostrzewski et al. | 382/232 |
| 6,731,332 | B1 | * | 5/2004 | Yasui et al. | 348/148 |
| 6,937,773 | B1 | * | 8/2005 | Nozawa et al. | 382/243 |

| 2003/0142750 | A1 | * | 7/2003 | Oguz et al. | 375/240.18 |
| 2007/0098274 | A1 | * | 5/2007 | Ibrahim et al. | 382/233 |
| 2007/0217700 | A1 | * | 9/2007 | Nagasaka | 382/232 |

(Continued)

FOREIGN PATENT DOCUMENTS

JP    10-210046    8/1998

(Continued)

OTHER PUBLICATIONS

3D Face Tracking Based Facial; http://ai.stanford.edu/~gokturkb/expression/00/28725 (publication date unknown, printed from website approximately on Mar. 12, 2007).

*Primary Examiner* — Aaron W Carter
(74) *Attorney, Agent, or Firm* — Nutter McClennen & Fish LLP; John J. Penny, Jr.; Michael P. Visconti, III

(57) ABSTRACT

An image transmission apparatus comprises an outline extraction processor, a selector, and a transmission module. The outline extraction processor extracts an outline of a specific-type image element in each of the image frames and to create outline data, based on image data representing the image frames. The selector selects the image data or the outline data for each image frame for transmission to an external receiving device. An image processing apparatus in another embodiment comprises an outline extraction processor, a scene change determination module, and a clipping processor. The scene change determination module determines that a scene change is occurred between two image frames when an amount of change between the outlines in the two image frames exceeds a prescribed threshold value. The clipping processor creates clipped motion picture data representing multiple image clips which are obtained by dividing the motion picture between two image frames when the determination that a scene change has occurred between the two image frames is made.

7 Claims, 15 Drawing Sheets

U.S. PATENT DOCUMENTS

2008/0310742 A1 * 12/2008 Kostrzewski et al. ........ 382/236

FOREIGN PATENT DOCUMENTS

| | | |
|---|---|---|
| JP | 10-276388 | 10/1998 |
| JP | 11-146333 | 5/1999 |
| JP | 2001-346156 | 12/2001 |
| JP | 2002-135707 | 5/2002 |
| JP | 2003-69947 | 3/2003 |
| JP | 2003-299005 | 10/2003 |
| JP | 2004-336382 | 11/2004 |
| JP | 2005-27159 | 1/2005 |
| JP | 2005-339288 | 12/2005 |
| WO | WO 00/28725 | 5/2000 |

* cited by examiner

MOTION PICTURE CLIPPING

CLIPPING INFORMATION CPI (EXPRESSED AS METADATA)

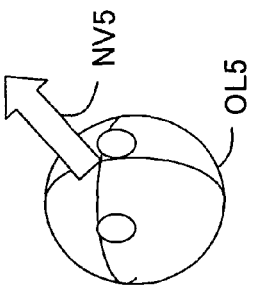
Fig.11A FRAME F1
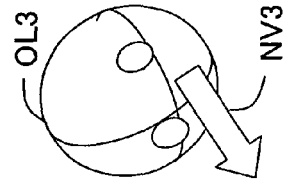
Fig.11B FRAME F2
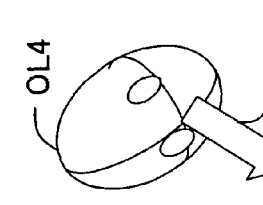
Fig.11C FRAME F3
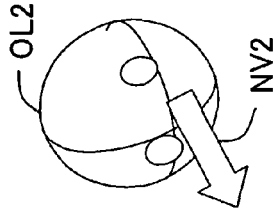
Fig.11D FRAME F4
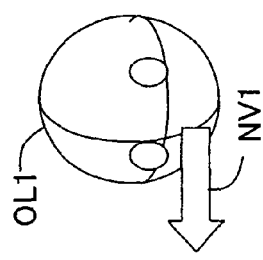
Fig.11E FRAME F5
SCENE CHANGE
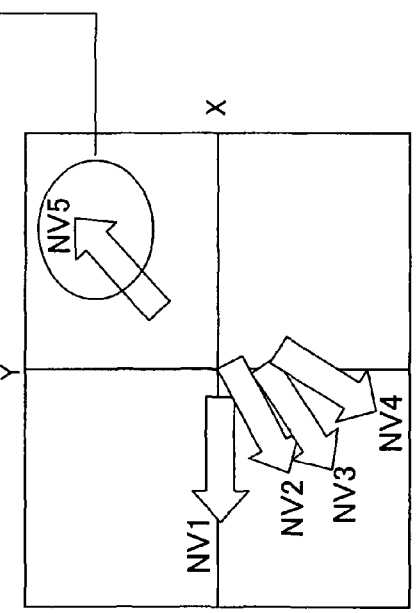
Fig.11F CHANGE IN OUTLINE DIRECTION VECTORS NV

MOTION PICTURE CLIPPING

CLIPPING INFORMATION CPI (EXPRESSED AS METADATA)

```
...
...
<metaclip id="1" startframe="1" endframe="100" bestframe="53">
<metaclip id="2" startframe="101" endframe="150" bestframe="120">
<metaclip id="3" startframe="151" endframe="312" bestframe="">
...
...
```
CPI

IMAGE TRANSFER AND MOTION PICTURE CLIPPING PROCESS USING OUTLINE OF IMAGE

CROSS REFERENCE TO RELATED APPLICATIONS

The present application claims the priorities based on Japanese Patent Application Nos. 2006-68835 and 2006-68837, both filed on Mar. 14, 2006, the disclosures of which are hereby incorporated by reference in its entirety.

BACKGROUND OF THE INVENTION

1. Field of the Invention

The present invention relates to a technology for transfer and processing of images such as motion pictures and still images.

2. Description of the Related Art

Image transfer generally involves the transfer of image data compressed based on an image compression standard such as JPEG or MPEG (see, for example, JP2003-299005A).

However, where narrow-band communication paths such as those in a cellular telephone network are used, the compressed image data sometimes cannot be transmitted at a sufficiently high transfer rate.

As for motion pictures, there is another problem that it is not always easy to search and replay motion pictures. A technology is known that divides an original motion picture into multiple motion picture clips in order to make it easier to search and replay motion pictures (see, for example, JP2005-27159A).

However, in the prior art technology, the task of dividing the motion picture is carried out manually for the most part, and is very labor-intensive and burdensome.

SUMMARY OF THE INVENTION

An object of the present invention is to provide a technology that can transfer images at a sufficiently high rate even over narrow-band communication paths. Another object of the present invention is to provide a technology that enables a motion picture to be divided easily into multiple motion picture clips.

According to an aspect of the present invention, there is provided an image transmission apparatus for transmitting multiple image frames. The image transmission apparatus comprises an outline extraction processor, a selector, and a transmission module. The outline extraction processor extracts an outline of a specific-type image element in each of the image frames and to create outline data, based on image data representing the image frames. The selector selects the image data or the outline data for each image frame. The transmission module configured to transmit the selected data to an external receiving device.

Because either image data or outline data is selected for each image frame and transmitted to a receiving apparatus, an image that closely resembles the original image can be reconstructed from these two types of data in the receiving apparatus. Furthermore, because the outline data will be significantly smaller in amount than the image data, images can be transferred at a sufficiently high transfer rate even over narrow-band communication paths.

According to another aspect of the present invention, there is provided an image processing apparatus for dividing a motion picture into multiple motion picture clips. The image processing apparatus comprises an outline extraction processor, a scene change determination module, and a clipping processor. The outline extraction processor extracts an outline of a specific-type image element in each image frame of the motion picture and to create outline data, based on image data representing the image frames of the motion picture. The scene change determination module determines that a scene change is occurred between two image frames when an amount of change between the outlines in the two image frames exceeds a prescribed threshold value. The clipping processor creates clipped motion picture data representing multiple image clips which are obtained by dividing the motion picture between two image frames when the determination that a scene change has occurred between the two image frames is made.

Because the existence or absence of a scene change is determined based on the amount of change in the outlines of a specific-type image element in image frames, and the motion picture is divided where a scene change occurred, a motion picture can be easily and automatically divided into multiple motion picture clips.

The present invention may be implemented in various forms, such as in the form of an image transfer method or apparatus, an image receipt/reproduction method or apparatus, an image transmission/receipt method or image transmission/receipt system, an image processing method or apparatus, a computer program to implement the functions of these methods or apparatuses, or a recording medium on which such computer program is recorded, or in the form of data signals encoded in a carrier wave that includes this computer program.

These and other objects, features, aspects, and advantages of the present invention will become more apparent from the following detailed description of the preferred embodiments with the accompanying drawings.

BRIEF DESCRIPTION OF THE DRAWINGS

FIGS. 11A through 11F show the contents of the scene change determination process;

DESCRIPTION OF THE PREFERRED EMBODIMENT

Embodiments of the present invention will now be described according to the following sequence.
A. First embodiment
B. Second embodiment
C. Third embodiment
D. Fourth embodiment
E. Variations

A. First Embodiment

Figure 1:
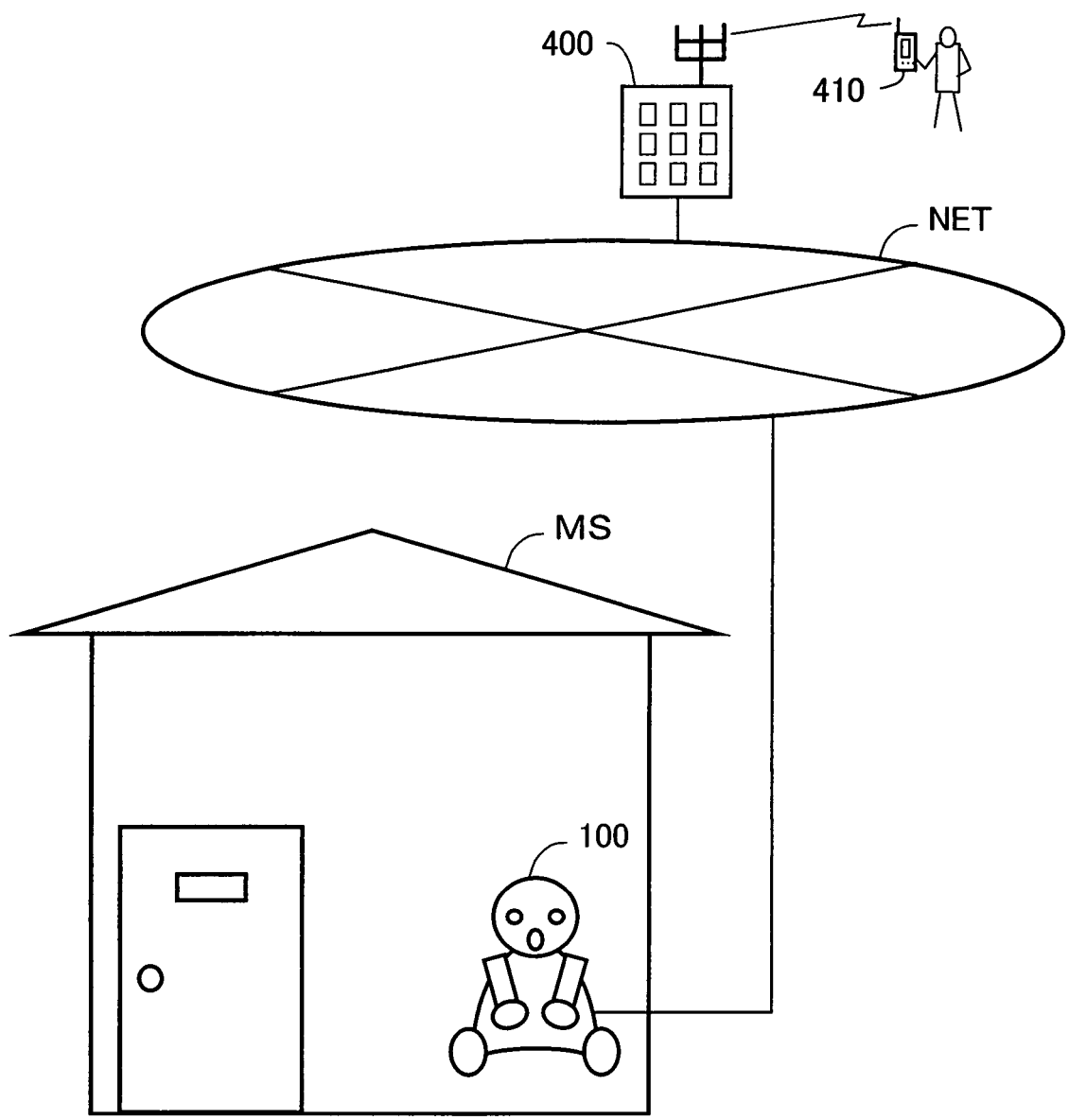
FIG. 1 shows the construction of an image transfer system as a first embodiment of the present invention.

FIG. 1 shows the construction of an image transfer system as a first embodiment of the present invention. This image transfer system includes a monitoring robot 100 located in a monitoring site MS and a cellular telephone network base station 400, and these are interconnected over a network NET. The base station 400 carries out wireless communication with a cellular terminal 410 that functions as a cellular phone.

It is preferred that wireless communication be used for some of the connection paths between the monitoring robot 100 and the network NET. Specifically, the monitoring robot 100 may be wirelessly connected to a wireless LAN (not shown) within the monitoring site MS and this wireless LAN is connected to the external network NET over a gateway or router. In this example, the Internet is used as the network NET, but any desired network construction other than the Internet may be used for the network.

Figure 2:
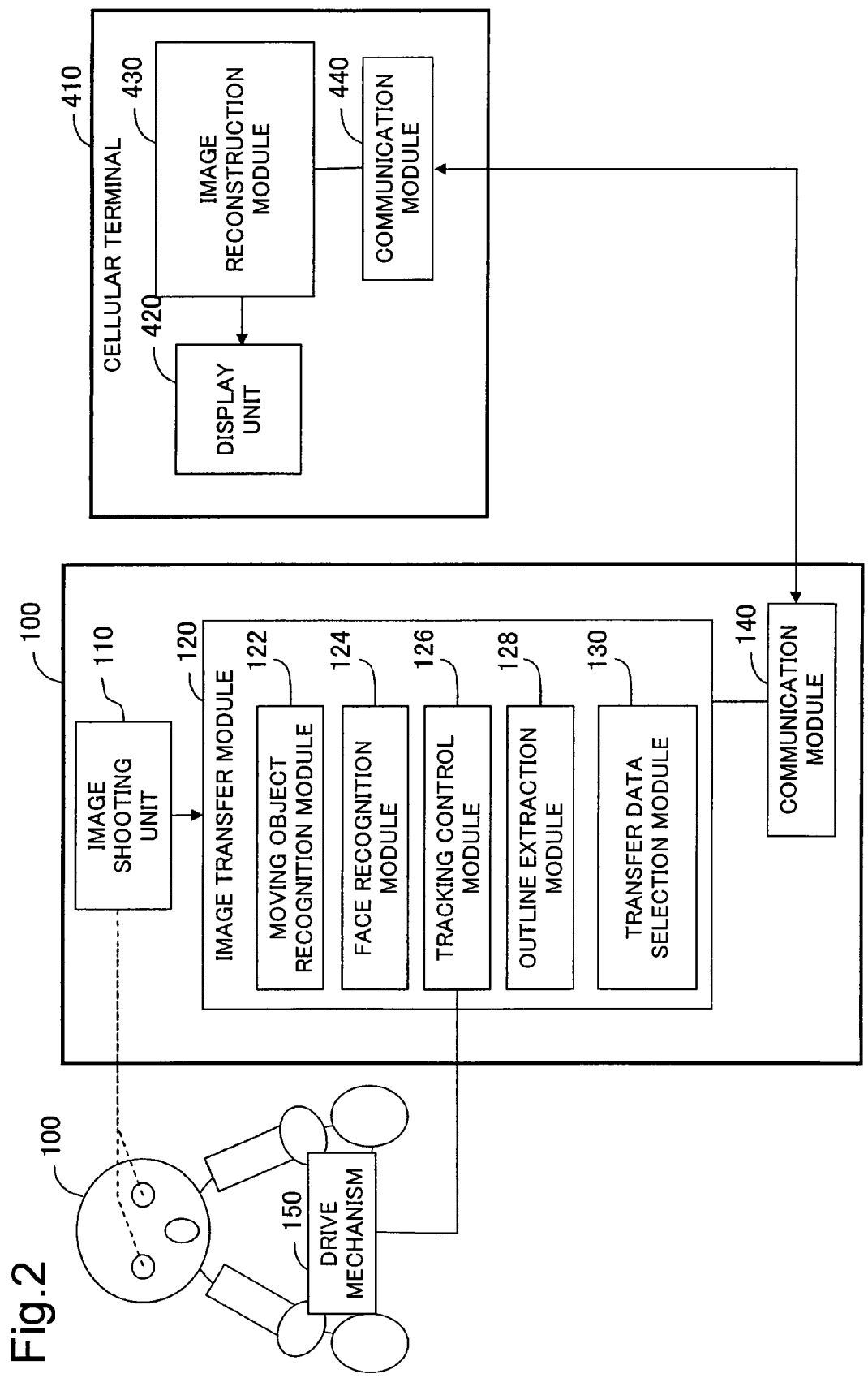
FIG. 2 is a block diagram showing the functions of a monitoring robot and a cellular terminal.

FIG. 2 is a block diagram showing the functions of the monitoring robot 100 and the cellular terminal 410. The monitoring robot 100 includes an image shooting unit 110 disposed in the eye positions, an image transfer module 120 and a communication module 140. The image transfer module 120 includes a moving object recognition module 122, a face recognition module 124, a tracking control module 126, an outline extraction module 128 and a transfer data selection module 130. The functions of the various modules will be described in detail below. These modules can be implemented via hardware or software. The monitoring robot 100 also incorporates a driving mechanism 150 that causes the monitoring robot 100 to move within the monitoring site MS and actuates the various components of the monitoring robot 100.

The cellular terminal 410 includes a display unit 420, an image reconstruction module 430 and a communication module 440. The image reconstruction module 430 reconstructs images based on data transmitted from the monitoring robot 100, and includes a function to perform display thereof on the display unit 420. These functions will be described in detail below. In order to implement the functions of the image reconstruction module 430, it is preferred that the cellular terminal 410 include a GPU (Graphics Processing Unit) that can carry out image processing such as rendering at high speed.

Figure 3:
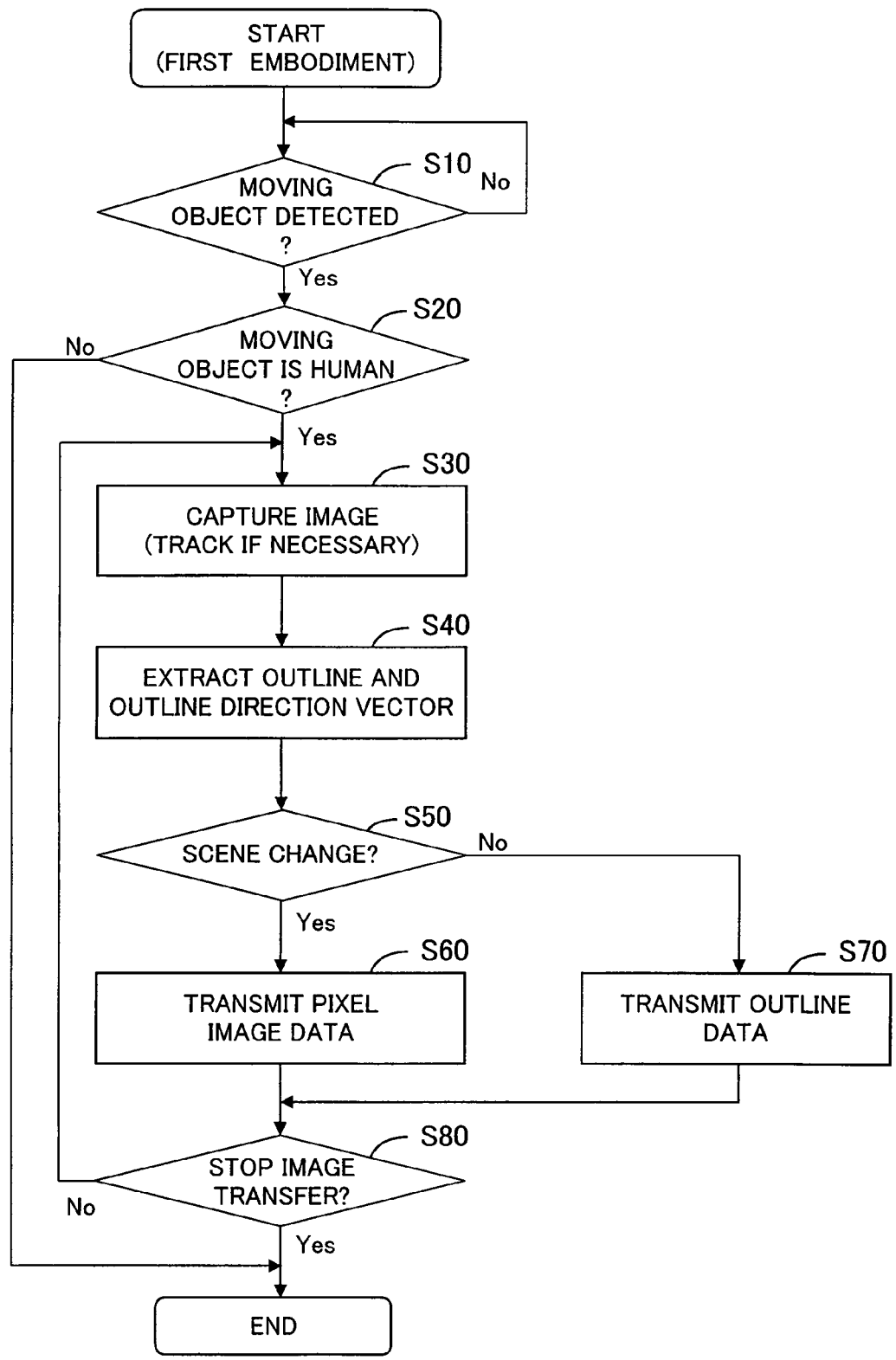
FIG. 3 is a flow chart showing the sequence of operations of image transfer processing carried out in the first embodiment.
Figure 4:
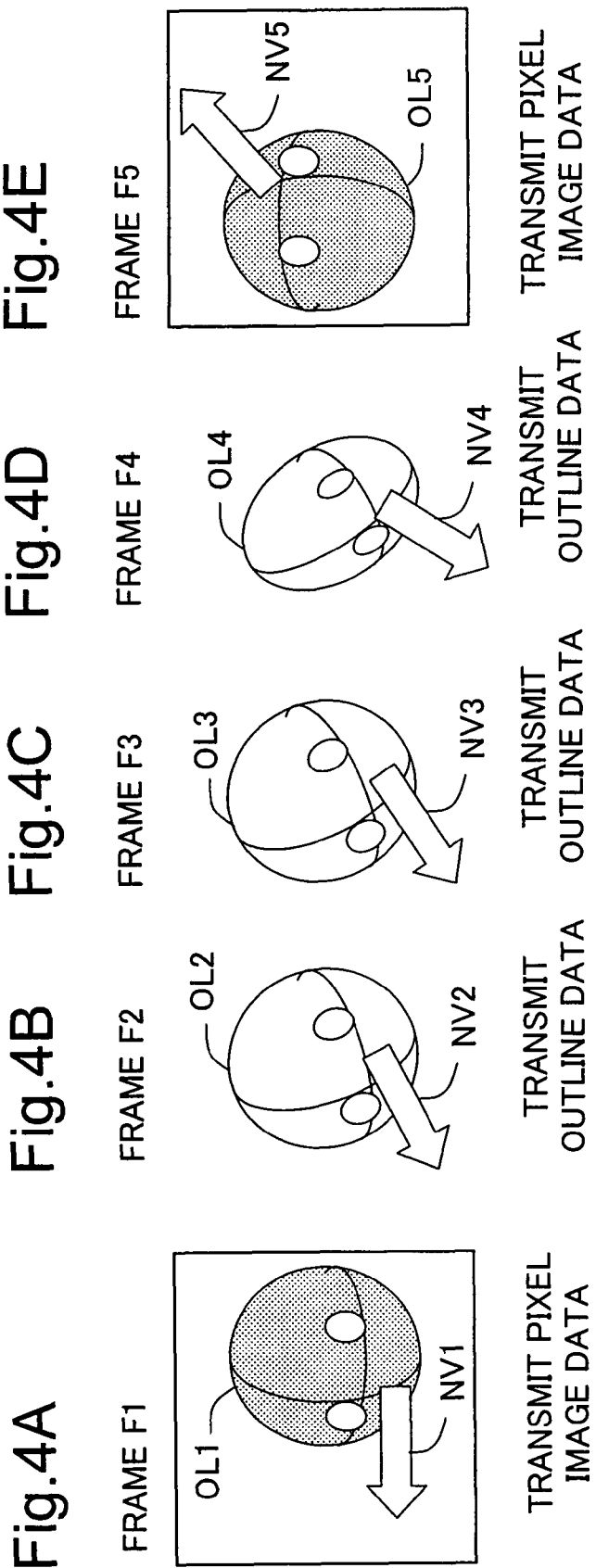
FIGS. 4A through 4E show outlines and outline direction vectors for various frames.

FIG. 3 is a flow chart showing the overall processing carried out in the first embodiment. In step S10, the moving object recognition module 122 of the monitoring robot 100 determines whether or not a moving object has been detected based on images from the image shooting unit 110. If a moving object has been detected, the moving object recognition module 122 determines whether or not the moving object is a person in step S20. This determination can be made based on the configuration of the outline of the moving object or based on the existence of a human face in the moving object, for example. The determination of whether or not a human face exists in the moving object can be made by the face recognition module 124, for example. If the moving object is not a person, overall processing is ended and the process returns to a standby state, while if the moving object is a person (hereinafter simply a 'subject') the operations including and after step S30 are executed. It should be noted that Steps S10 and S20 can be omitted form the flowchart.

In step S30, the monitoring robot 100 captures an image that includes the face of the subject. In this case, the image captured by the image shooting unit 110 is forwarded to the face recognition module 124 and this image capturing (or image shooting) and face recognition processing are repeated until it is determined by the face recognition module 124 that the captured image includes a face. Here, in order to enable images that include a face to be obtained, it is acceptable if image shooting is repeatedly carried out while the subject is being tracked by the monitoring robot 100 through cooperation of the tracking control module 126 and the face recognition module 124. Because the monitoring robot 100 has a drive mechanism 150 (hereinafter also the 'moving mechanism') it offers the advantage that the subject can be tracked and images that includes the subject's face can be obtained.

In step S40, the outline extraction module 128 extracts an outline of the face in the image and an outline direction vector that indicates the direction or orientation of that outline.

FIGS. 4A-4E show examples of outlines and associated outline direction vectors in multiple frames F1-F5 of a motion picture. In this Specification, 'image frame' or 'frame' means an image for one screen. The outline extraction module 128 extracts face region outlines OL1-OL5 from the individual frames. This outline OLj (here, 'j' is a frame number) is a kind of face wire-frame model, and includes a curved line indicating the outer configuration of the face, a longitudinal and latitudinal line that travel through the surface of the face in a cross configuration, and curved lines indicating the outlines of the eyes. The longitudinal and latitudinal lines can be sought by estimating the curved surface that contains the face based on the outer configuration of the face region and the placement of parts of the face (such as the eyes, for example). The outline OLj can include other desired curved line elements as well.

FIGS. 4A-4E also show outline direction vectors NV1-NV5 that indicate the direction or orientation of the outline. The outline direction vector NVj (again, 'j' is a frame number) can be obtained via calculation of the gradient of the center region of the outline OLj. More specifically, the outline direction vector NVj can be obtained by seeking the gradients for the longitudinal and latitudinal lines of the outline and synthesizing them. In this embodiment, because only the direction of the vector is important, the lengths of all vectors can be set to equal length.

In step 50 of FIG. 3, the transfer data selection module 130 determines whether or not a scene change has occurred. As described below, in this embodiment, the presence or absence of a scene change is determined based on the direction of the outline direction vector NVj.

Figure 5:
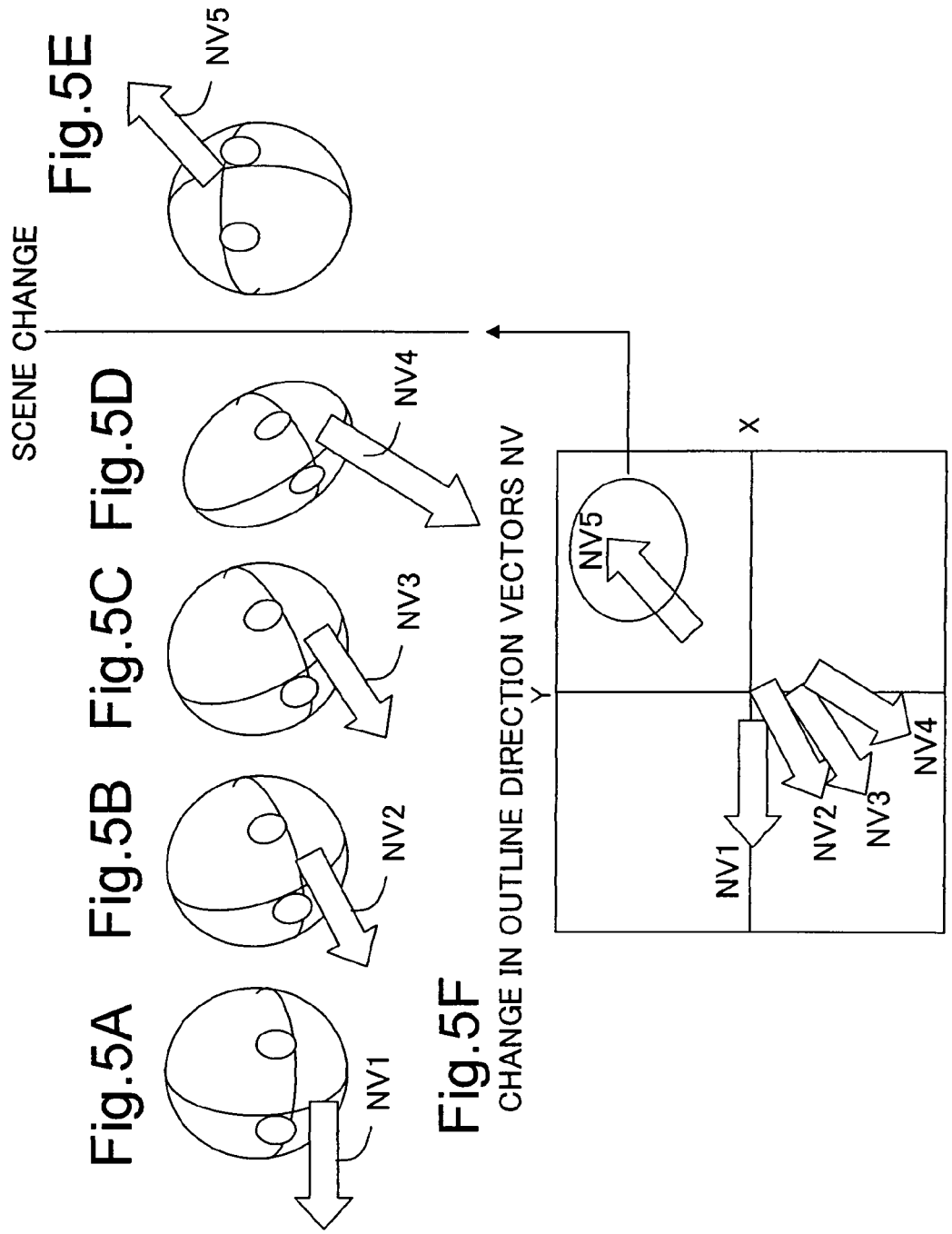
FIGS. 5A through 5F show the contents of the scene change determination process.

FIGS. 5A-5F show the contents of the scene change determination process in the first embodiment. FIGS. 5A-5E show outline direction vectors NVj for the frames identical to those shown in FIGS. 4A-4E. FIG. 5F shows the outline direction vectors NVj in an X-Y coordinate plane. Here, the X-Y coordinate system is a two dimensional coordinate system using the center of the face region (face outline) as the origin. In this embodiment, whether or not a scene change exists in a given frame (called the 'current frame') can be determined based on whether or not the direction of the outline direction vector NVj of the face region of the current frame has changed by more than a prescribed threshold value relative to the direction of the outline direction vector NVj−1 of the face region of the frame immediately preceding the current frame (called the 'previous frame'). This determination threshold value can be set at 45°, for example. In the first four frames shown in FIGS. 5A-5D, because the changes in direction of the outline direction vectors NVj are small, it is determined that a scene change has not occurred. However, in the fifth frame shown in FIG. 5E, because the direction of the outline direction vector NV5 has changed by more than 45° relative to the outline direction vector NV4 for the previous frame, it is determined that a scene change has occurred.

Where it is determined in step S50 of FIG. 3 that a scene change has occurred, in step S60, the transfer data selection module 130 selects pixel image data of the current frame, and the communication module 140 transmits this pixel image data to the cellular terminal 410. Here, 'pixel image data' means image data in which the image data is expressed as pixel values, such as JPEG image data or bitmap data. This pixel image data is called 'still image frame data' or simply 'image data'. It is preferred that the pixel image data is in the form of compressed image data.

If it is determined in step S50 that a scene change has not occurred, on the other hand, in step S70, the transfer data selection module 130 selects outline data expressing the outline of the face region in the current frame, and the communication module 140 transmits this outline data to the cellular terminal 410. In the example of FIGS. 4A-4E, pixel image data is transmitted for the first and fifth frames F1 and F5, while outline data is transmitted for the second through fourth frames F2-F4.

The image reconstruction module 430 of the cellular terminal 410 reconstructs the frames F1-F5 based on the data transmitted from the monitoring robot 100. Specifically, if pixel image data is received, the image reconstruction module 430 reproduces the image frame based on this pixel image data and displays it on the display unit 420. If outline data is received, on the other hand, the image reconstruction module 430 determines the pixel values in the outline by performing rendering processing within the outline of the face region expressed by the outline data, and then reproduces this image frame and displays it in the display unit 420 based on the pixel values. In this rendering processing, the pixel values of pixels in the outline of the previous frame are copied to the corresponding pixel positions in the outline of the current frame. In order to perform this rendering processing, it is acceptable if the outline data is also transmitted for frames for which pixel image data is transmitted. Various types of processing other than the processing described above can be used as this rendering processing.

In this rendering processing, the background of the previous frame can be copied as is with respect to the area surrounding the face region outline. In this case, where the face region outline has moved within the screen and part of the background of the current frame was a face region in the previous frame, the pixel values of the area around that portion of the background can be copied thereto. Alternatively, prescribed values (such as 0, 128, 255 or the like in the case of 8-bit pixel values, for example) can be allocated to the pixels outside the outline as pixel values.

The motion picture displayed on the display unit 420 of the cellular terminal 410 as described above is somewhat degraded in quality compared to the motion picture reproduced based on normal motion picture data; it may be called a 'pseudo-motion picture' that closely resembles the original motion picture. Because frames for which only outline data is transmitted contain much less transfer data than normal motion picture data, they are well suited for motion picture transfer via narrow-band communication paths such as those of a cellular telephone network.

The reason that the presence or absence of a scene change is determined based on face region outline direction vectors in step S50 is that the face region in the transferred image is an important image element for the user of the cellular terminal 410. In other words, the user of the cellular terminal 410 located at a distance from the monitoring site MS observes the image transferred from the monitoring robot 100 and expects to determine whether or not the subject is a suspicious person. To that end, the user may wish to have at least the face region of the subject reproduced on the cellular terminal 410. Accordingly, if a scene change is determined to exist when there is a large change in the direction of the face region vector and pixel image data is transferred upon such determination, the user's intention can be satisfied.

In step S80 of FIG. 3, it is determined according to prescribed rules whether the image transfer module 120 stops image transfer or continue image transfer. If it is determined that image transfer should be continued, the process returns to step S30 and the operations of steps S30-S80 are repeated. In the determination of step S80, it can be determined that image transfer should be stopped if a prescribed amount of time has elapsed since the beginning of image transfer, for example. Alternatively, it can be determined that image transfer should stop if the subject's face can no longer be captured.

Because pixel image data is transmitted if a scene change has occurred while outline data is transmitted if a scene change has not occurred, the amount of transmitted data can be significantly reduced, which is preferable in the data transfer over narrow-band communication paths. Therefore, a motion picture that closely resembles the original motion picture can be smoothly reproduced on the receiving-side cellular terminal 410.

B. Second Embodiment

Figure 6:
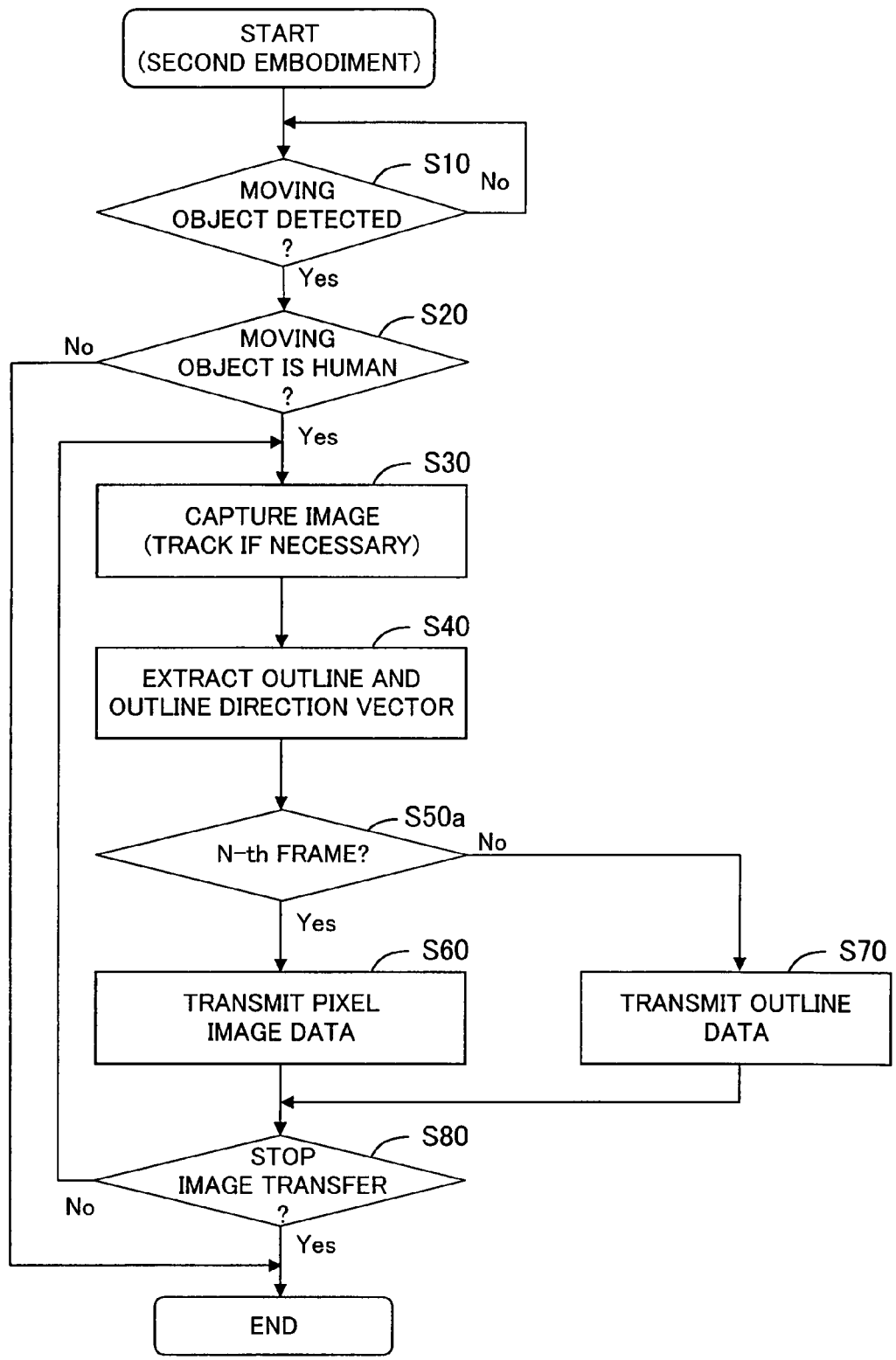
FIG. 6 is a flow chart showing the sequence of operations of image transfer processing carried out in the second embodiment.

FIG. 6 is a flow chart showing the overall processing carried out in the second embodiment, and corresponds to FIG. 3 for the first embodiment. The second embodiment differs from the first embodiment only in that the step S50 in FIG. 3 is changed, and is otherwise identical to the first embodiment in terms of both the processing sequence and the apparatus construction.

In step S50a of FIG. 6, it is determined whether or not the current frame is a n-th frame where n is a prescribed number. If the current frame is the n-th frame, pixel image data is transmitted in step S60, while if the current frame is not the n-th frame, outline data is transmitted in step S70. For example, it is acceptable if pixel data is transmitted for one frame and outline data is transmitted for the following three frames, and this transfer processing is carried out on a repeating basis. In this case, the prescribed number n is 4.

Even if pixel image data is transmitted only for prescribed n-th frames in this way, the amount of transfer data can be reduced significantly as in the first embodiment. However, if the scene changes considerably in the second embodiment (i.e., where, for example, the face region has disappeared from the screen), the outline extraction module 128 (see FIG. 2) might no longer be able to extract face region outline data. Therefore, the system of the first embodiment is preferred from this standpoint. However, the processing sequence in the second embodiment may be modified such that pixel image data is transmitted if a significant scene change has occurred. In this case, the occurrence of the above problem can be prevented.

C. Third Embodiment

Figure 7:
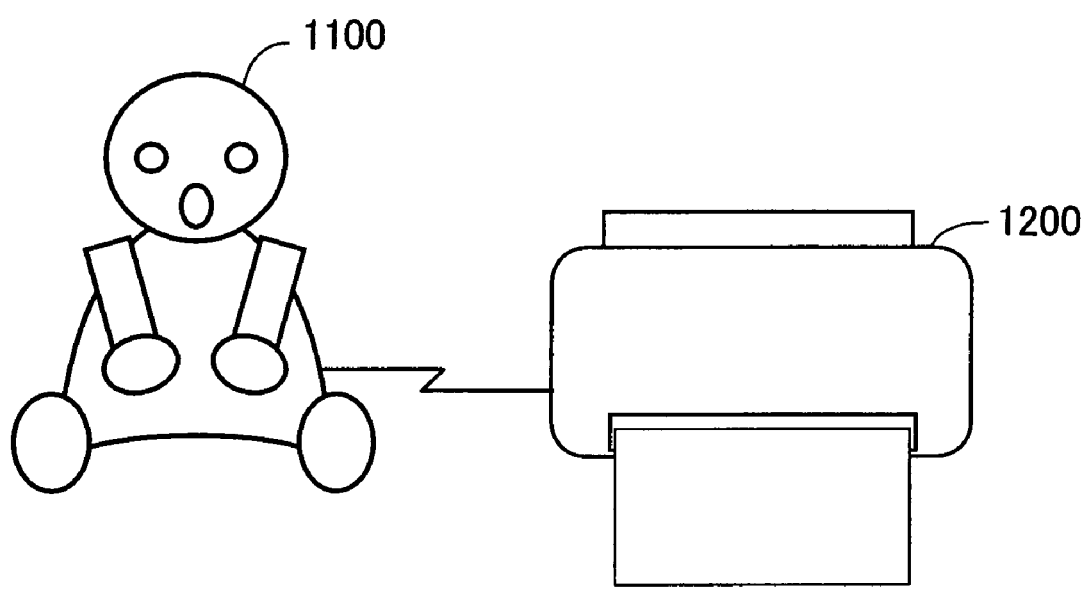
FIG. 7 shows the construction of an image processing system as a third embodiment of the present invention.

FIG. 7 shows the construction of an image processing system as a third embodiment of the present invention. This image processing system includes a monitoring robot 1100 that incorporates an image shooting device, and a printer 1200, which are interconnected over wires or wirelessly. As described below, a motion picture captured by the monitoring robot 1100 can be displayed on the display unit of the printer 1200 and some images in the motion picture can be printed by the printer 200.

Figure 8:
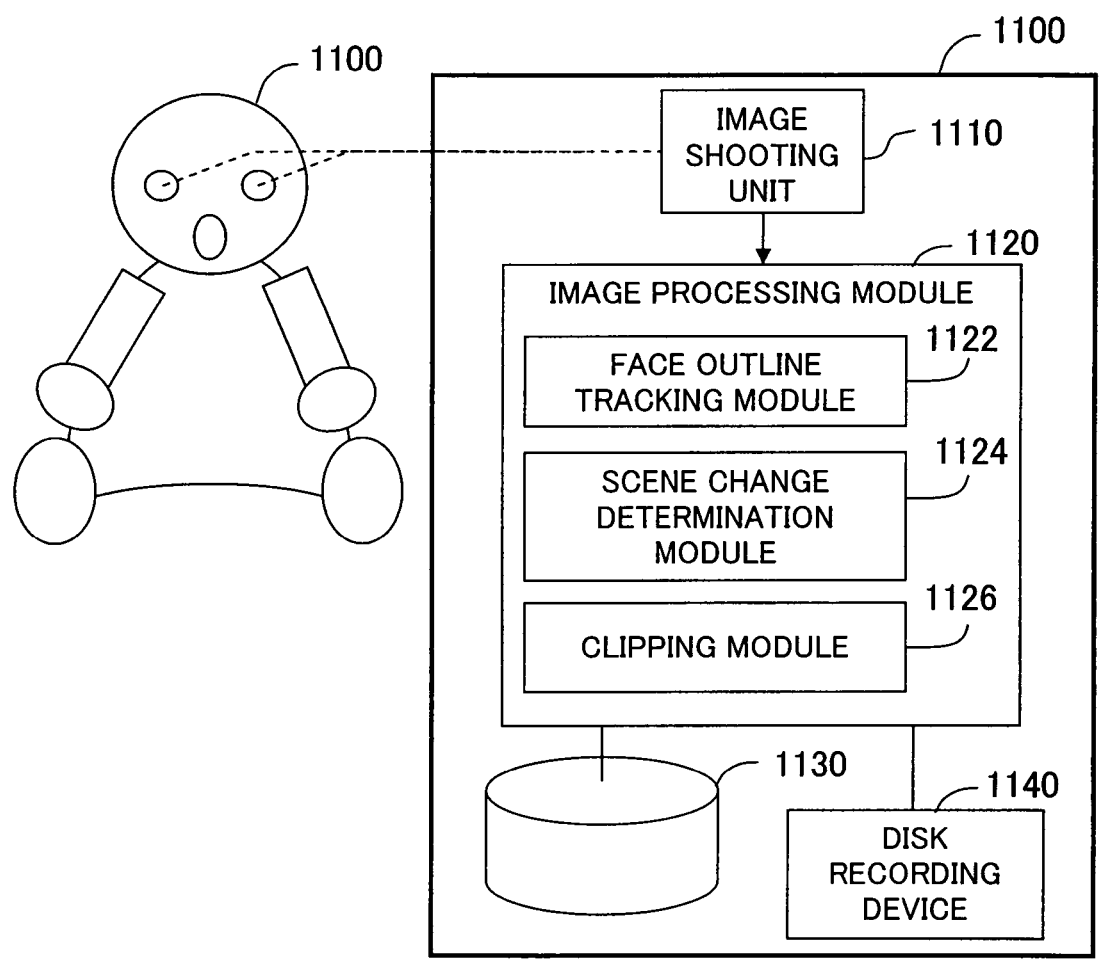
FIG. 8 is a block diagram showing the functions of a monitoring robot.

FIG. 8 is a block diagram showing the functions of the monitoring robot 1100. The monitoring robot 1100 includes an image shooting unit 1110 disposed at the eye position, an image processing module 1120, a hard disk device 1130, and a disk recording device 1140. The image module 1120 includes a face outline tracking module 1220, a scene change determination module 1124 and a clipping module 1126. The functions of each module will be described in detail below. These modules may be implemented via either hardware or software. The disk recording device 1140 is a device for recording data to a writable disk such as a CD-R or DVD.

Figure 9A:
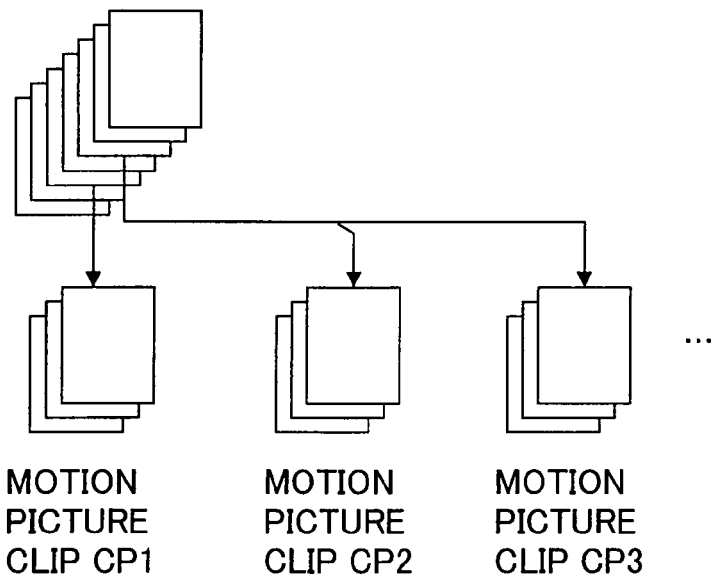
FIGS. 9A and 9B are explanatory drawings showing the summary of clipping processing in the third embodiment.
Figure 9B:
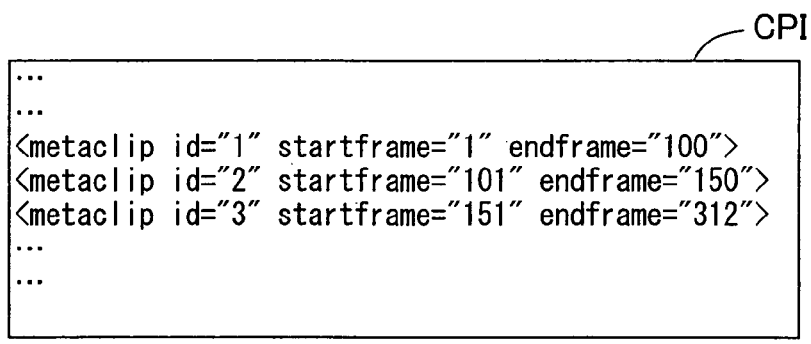

FIGS. 9A and 9B show the summary of the clipping process executed in the third embodiment. FIG. 9A shows the division of an original motion picture OMP into multiple motion picture clips CP1, CP2, CP3, . . . via the clipping process. A 'motion picture clip' means a motion picture that includes only a portion of the original motion picture OMP and comprises the various multiple image frames. An 'image frame' or 'frame' means the image for a single screen image.

FIG. 9B shows an example of clipping information CPI created during the clipping process. The clipping information CPI expresses the boundaries between the multiple motion picture clips, and comprises information associated with the original motion picture OMP. The association between the original motion picture OMP and the clipping information CPI is described in one or both of the original motion picture OMP and/or the clipping information CPI.

The clipping information CPI in FIG. 9B includes the identifier (id) for each motion picture clip, the number of the first frame (startframe), and the number of the last frame (endframe). The clipping information CPI can be described via XML, for example. The information pertaining to each motion picture clip can be described as so-called meta-information or 'meta data'. The clipping information CPI may alternatively be described using MPV (Music Photo Video) standards.

Each of motion picture clips after the clipping process may, but need not, be constructed as separate motion picture data. Where each motion picture clip is constructed as an individual motion picture data, it is preferred that each motion picture clip be associated with the clipping information CPI for the original motion picture. Furthermore, the clipping information CPI need not exist separately from the motion picture data, and the clipping information CPI may be described within the motion picture data. In this Specification, the combination of the data expressing the motion picture itself and the clipping information is called 'clipped motion picture data'. Furthermore, data that expresses a motion picture but does not include clipping information is called 'motion picture data'.

Figure 10:
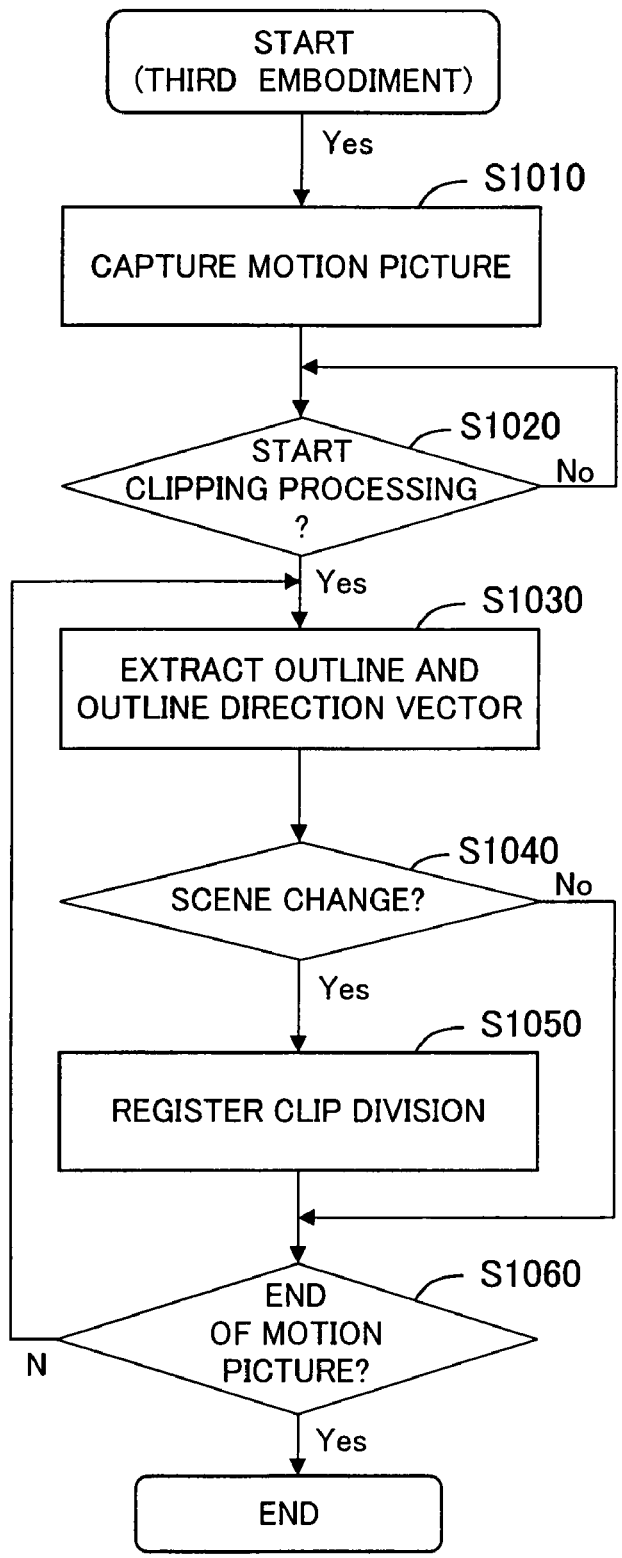
FIG. 10 is a flow chart showing the sequence of operations of the image processing executed in the third embodiment.

FIG. 10 is a flow chart showing the overall processing carried out in the third embodiment. In step S1010, the image shooting unit 1110 of the monitoring robot 1100 captures a motion picture of a subject. In step S1020, it is determined whether or not the clipping process for the captured motion picture is to begin. This determination may be made based on whether or not an instruction to begin processing has been issued by the user of the monitoring robot 1100, for example, or based on the occurrence of some specified event or after a prescribed period of time has elapsed.

When the clipping process is to be performed, first, in step S1030, the face outline tracking module 1122 extracts an outline of the face in each image frame, as well as an outline direction vector that indicates the direction or orientation of that outline.

FIGS. 11A-11E show examples of face outlines in multiple frames F1-F5 in the motion picture and associated face direction vectors. The face outline tracking module 1122 extracts face region outlines OL1-OL5 from each frame. This outline OLj (here, 'j' is a frame number) is a type of face wire-frame model, and includes a curved line indicating the outer configuration of the face, longitudinal and latitudinal lines that travel through the surface of the face in a cross configuration, and curved lines indicating the outlines of the eyes. The longitudinal and latitudinal lines can be sought by estimating the curved surface that contains the face based on the outer configuration of the face region and the placement of parts of the face (such as the eyes, for example). The outline OLj can include other desired curved line elements as well.

FIGS. 11A-11E also show outline direction vectors NV1-NV5 that indicate the direction of the outline. The outline direction vector NVj (again, 'j' is a frame number) can be obtained via calculation of the gradient of the center region of the outline OLj. More specifically, the outline direction vector NVj can be obtained by seeking the gradients for the longitudinal and latitudinal lines of the outline and synthesizing them. In this embodiment, because only the direction of the vector is important, the lengths of all vectors can be set to equal length. FIG. 11F shows the outline direction vectors NVj in an X-Y coordinate plane. Here, the X-Y coordinate system is a two dimensional coordinate system using the center of the face region (face outline) as the origin.

In step S1040 of FIG. 10, the scene change determination module 1124 determines whether or not a scene change has occurred. As described below, in this embodiment, the existence or absence of a scene change is determined based on the amount of change in the direction of the outline direction vector NVj (FIG. 11F). Specifically, in this embodiment, whether or not a scene change exists in a given frame (called the 'current frame') can be determined based on whether or not the direction of the outline direction vector NVj of the face region of the current frame has changed by a prescribed threshold value or more relative to the direction of the outline direction vector NVj−1 of the face region of the frame immediately preceding the current frame (called the 'previous frame'). This determination threshold value can be set at 45°, for example. In the first four frames shown in FIGS. 11A-11D, because the change in direction of the outline direction vector NVj is small, it is determined that a scene change has not occurred. However, in the fifth frame shown in FIG. 11E, because the direction of the outline direction vector NV5 has changed by more than 45° compared to the outline direction vector NV4 for the previous frame, it is determined that a scene change has occurred.

The scene change determination module 1124 can also determine whether a scene change has occurred using a determination method different from the determination method using the outline of the face region (i.e., using different determination parameters). Such other determination method may comprise a method in which, for example, where the difference between the average pixel value for the current frame and that for the previous frame equals or exceeds a prescribed threshold value, a scene change is determined to have occurred. In addition, for example, a maximum permitted time for one motion picture clip is set in advance and it is determined that the scene should be changed (i.e., that the boundary of the motion picture clip should be set) if this maximum permitted period of time has elapsed. However, it is possible that the scene change determination module 1124 determines that a scene change has occurred using only the face region outline-based method.

Where it is determined in step S1040 shown in FIG. 9 that a scene change has occurred, in step S1050, the clipping module 1126 registers the timing between the current frame and the previous frame as a motion picture clip division. Specifically, the last frame number ("endframe") of the first motion picture clip and the first frame number ("startframe") of the next motion picture clip are registered in the clipping information CPI shown in FIG. 9B.

On the other hand, where it is determined in step S1040 that a scene change has not occurred, the process advances to step S1060, and it is determined whether or not the end of the motion picture has been reached. If the end of the motion picture has not been reached, the process returns to step S1030, and the operations of steps S1030-S1060 described above are repeated for the next image frame.

Figure 12:
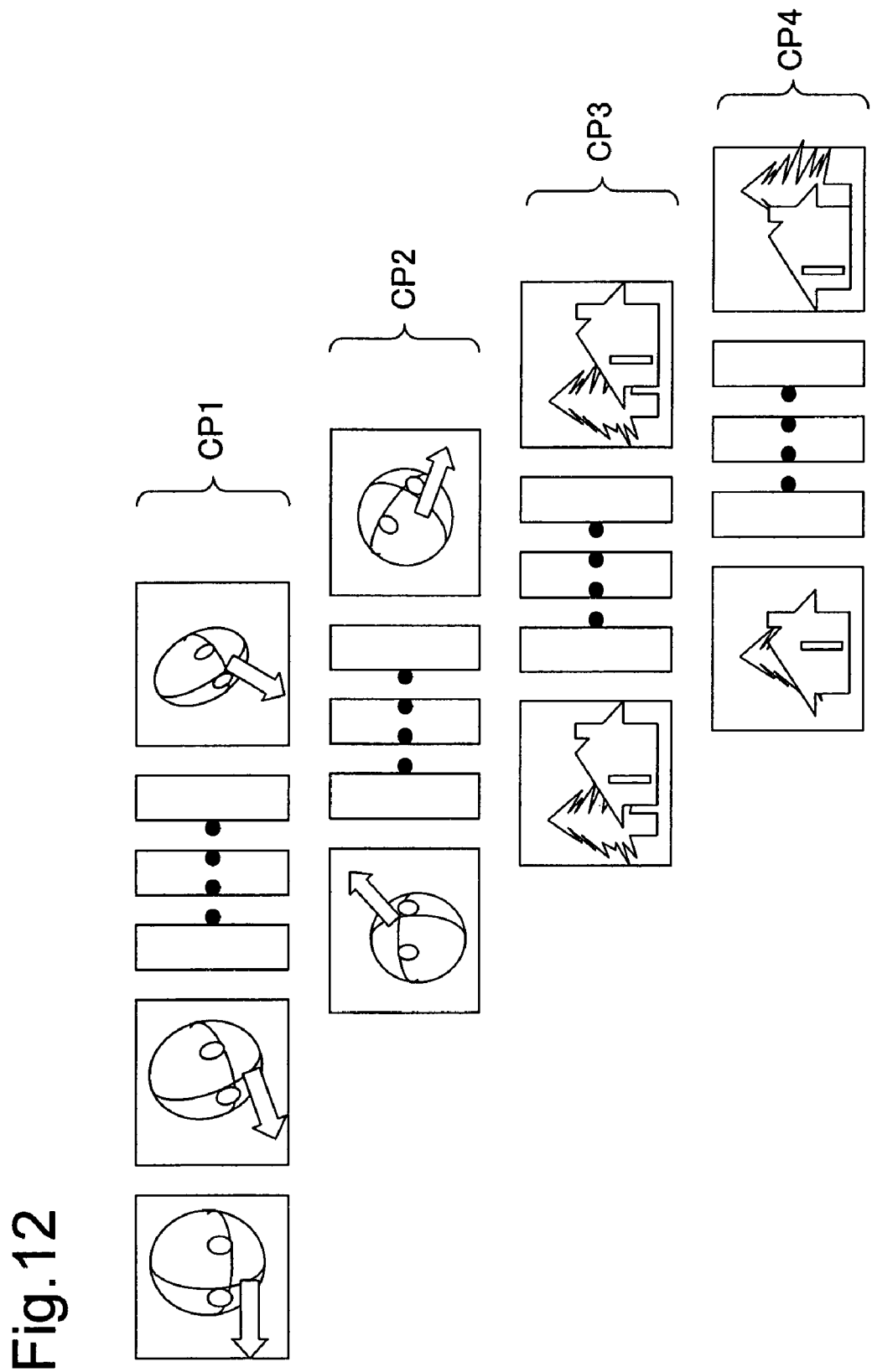
FIG. 12 shows examples of four motion picture clips divided during the clipping process.

FIG. 12 shows examples of four motion picture clips CP1-CP4 that are isolated using the clipping process. As described above, the division or boundary between the first and second motion picture clips CP1, CP2 is established by whether or not the amount of change in their face region outline direction vectors equals or exceeds a prescribed threshold value. The boundary between the second and third motion picture clips CP2, CP3 is established by the disappearance of the face region from the screen in the first frame of the third motion picture clip CP3. The boundary between the third and fourth motion picture clips CP3, CP4 is established by the fact that, for example, the average pixel value of the frame equals or exceeds a prescribed threshold value. If a scene change is determined according to multiple methods using various parameters that include the amount of change in face region outline direction vectors as described above, a scene change can be determined more appropriately.

Figure 13:
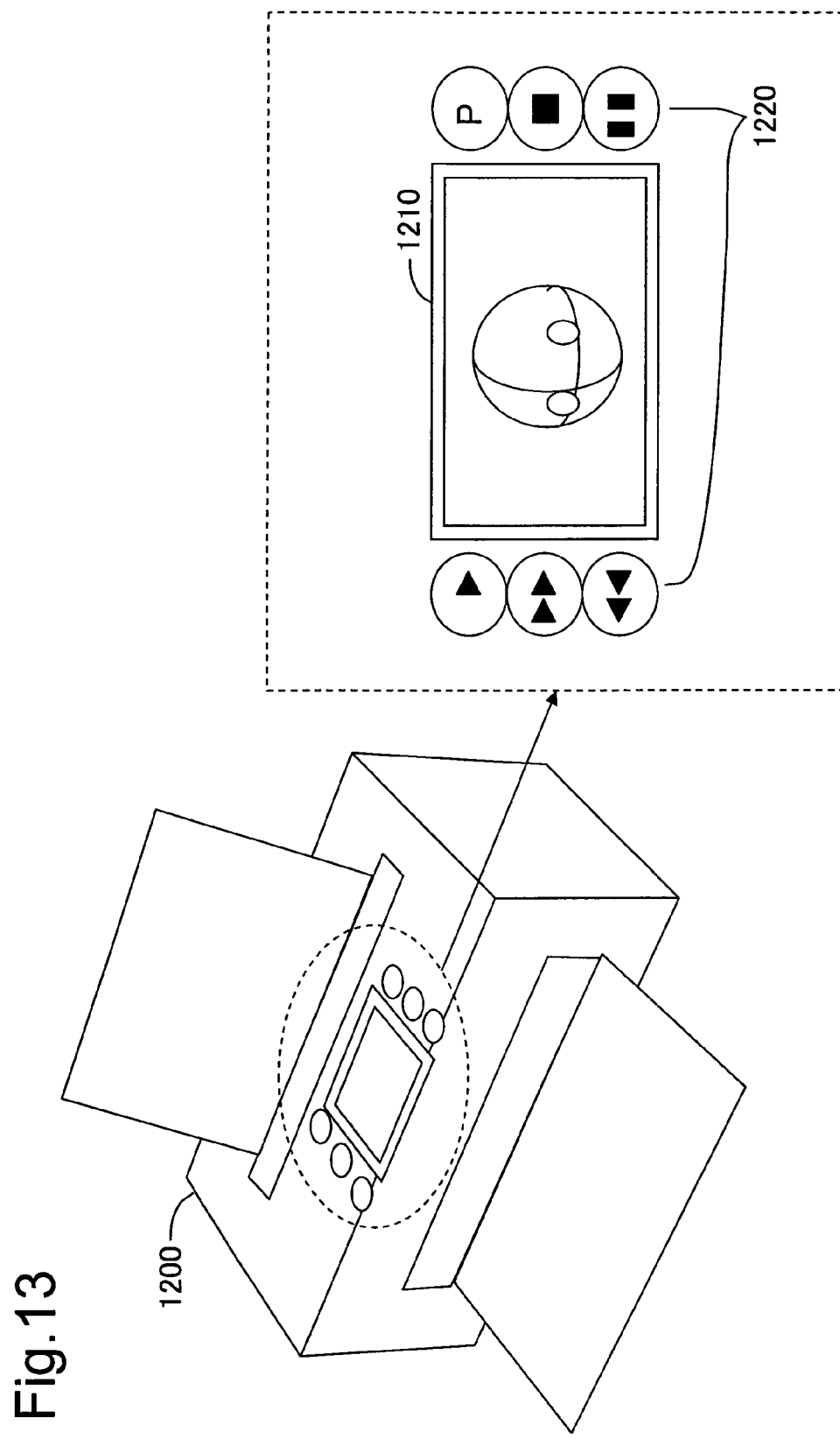
FIG. 13 shows an example of a printer that replays and prints motion picture clips.

FIG. 13 shows an example of a printer that replays and prints motion picture clips. This printer 1200 has a display device 1210 that displays images and an operation screen, as well as various operation buttons 1220. Clipped motion picture data created by the monitoring robot 1100 is provided to the printer 1200 either through a wired or wireless connection or on a CD-R or other disk.

The printer 1200 can replay each motion picture clip using clipped motion picture data, or can print a still image selected from a motion picture. In the example of FIG. 13, a print button (the button with 'P' marked on it), a stop button, a pause button, a replay button, a fast forward button and a rewind button are included as operation buttons 1220. The user can replay a desired motion picture clip using these buttons. For example, by pressing the fast forward button or the rewind button, the first frames of the motion picture clip can be displayed in series. Similarly, a still picture can be printed by pressing the pause button to stop the replay of a motion picture clip and then pressing the print button.

In this embodiment, because a scene change is determined to exist based on multiple methods using various parameters including the amount of change in face region outline direction vectors and because the point where the scene change occurs is set as the boundary between motion picture clips, motion picture clips can be created easily and automatically.

D. Fourth Embodiment

Figure 14:
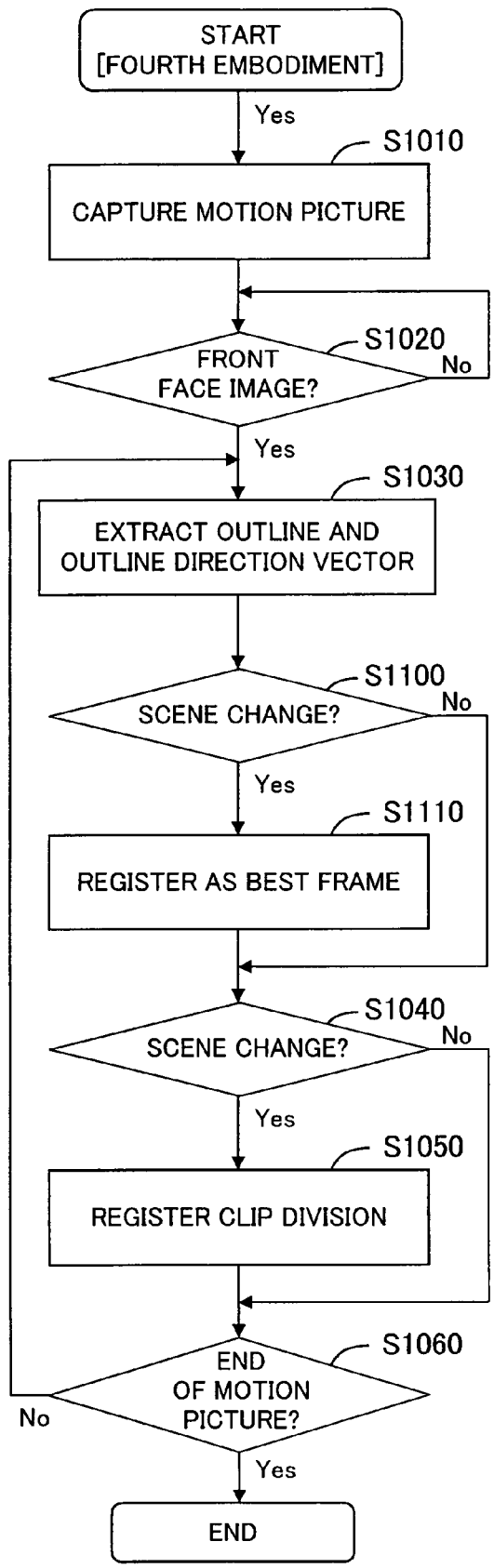
FIG. 14 is a flow chart showing the sequence of operations of the image processing executed in the fourth embodiment.

FIG. 14 is a flow chart showing the sequence of operations of the image processing executed in a fourth embodiment, and corresponds to FIG. 10 pertaining to the third embodiment. The fourth embodiment differs from the third embodiment only in that steps S1100, S1110 are added between steps S1030 and S1040 of FIG. 10. In all other respects, the sequence of operations and apparatus construction are identical to those in the third embodiment.

In step S1100 of FIG. 14, the face outline tracking module 1122 determines whether or not the current frame is an image including the front of a face. If it is an image including the front of a face, the clipping module 1126 registers the current frame in the clipping information CPI as a 'best frame' in step S1110.

Figures 15A, 15B:
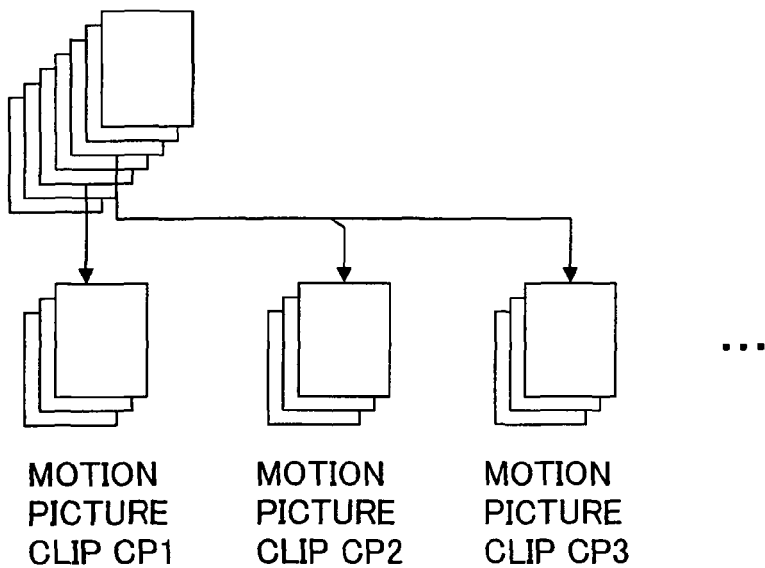
FIGS. 15A and 15B are explanatory drawings showing the summary of clipping processing in the fourth embodiment.

FIGS. 15A and 15B show the summary of the clipping process executed in the fourth embodiment and correspond to FIGS. 9A and 9B pertaining to the third embodiment. FIG. 15A is identical to FIG. 9A. The best frame number ("best-frame") is registered for each motion picture clip in the clipping information CPI shown in FIG. 15B. However, because image frames having the front of a face are not included in the third motion picture clip, a best frame number is not registered for this clip. More than one best frame number may be registered for one clip image. As shown in the example of FIG. 15B, if only one best frame is registered in one motion picture clip, the frame in which the front of a face is detected for the first (or last) time in that motion picture clip can be registered as the best frame.

In an output apparatus that replays motion picture clips for which the best frames are registered (such as the printer 1200), it is preferred that an user operation init for use in selecting the best frame be incorporated. For example, it is preferred that the user operation unit of the printer 1200 be constructed such that a selection option for jumping to a best frame be displayed on the display unit 1210 and that best frames be reproduced and printed by selecting this selection option.

In the fourth embodiment, because image frames that include images of the front of a person's face are registered as best frames, image frames that include people's faces can be easily sought, reproduced and printed.

E. Variations

The present invention is not limited to the above embodiments or examples, and can be implemented in various other forms within the essential scope thereof, and the following variations, for example, are possible.

E1. Variation 1:

As the determination method used to select either pixel image data or outline data in the first and second embodiments, any desired method different from the methods described in connection with the first and second embodiments can be employed. However, it is preferred that this selection be carried out based on prescribed rules.

E2. Variation 2:

In the first and second embodiments, a cellular terminal 410 was used as the receiving device, but any desired device other than a cellular terminal can be used as the receiving device.

E3. Variation 3:

In the first and second embodiments, face region outline data was transmitted when there was no scene change, but the present invention can be applied even where outline data for a prescribed image element other than the face region is transmitted. For example, outline data expressing the entirety of the moving object in the image frame can be transmitted. In order to enable recognition of the prescribed type of image element, it is preferred that the image transfer module 120 shown in FIG. 2 incorporate a recognition module that recognizes the prescribed type of image element.

E4. Variation 4:

In the first and second embodiments, the example of a motion picture transfer was used, but the present invention may also be applied to the transfer of multiple still images.

E5. Variation 5:

In the above embodiments, the presence or absence of a scene change was determined based on a change in the direction of face region outline vectors, but the occurrence of a scene change can be determined using various other methods. For example, it can be determined that a scene change has occurred where the difference between the average pixel values of the current frame and those of the previous frame equal or exceed a prescribed threshold value.

The presence or absence of a scene change may be also established based on the amount of change in the outline itself. For example, it is acceptable if the outlines for the current frame and the previous frame are matched, and it is determined that a scene change has occurred if the amount of matching does not reach a prescribed threshold value (i.e., if the amount of change in the outlines equals or exceeds a prescribed threshold value). However, using the amount of change in the outline direction vectors to make the scene change determination offers the benefit that the determination can be made more quickly and using fewer calculations.

The present invention may also be applied in methods that determine a scene change using the outline of a specific-type image element other than a face region. For example, a scene change determination can be based on the overall outline of the moving object in the image frame. In order to enable recognition of the specific-type image element, it is preferred that a recognition module that recognizes the specified image element be incorporated in the image module 1120 shown in FIG. 8.

In the above embodiments, the presence or absence of a scene change was determined via the extraction of a face region outline in all image frames in the motion picture, but it is also acceptable if the image frames are subjected to a certain degree of skip sampling, and the presence or absence of a scene change is determined between two image frames separated by a multiple frame interval. In this case, where it is determined that a scene changed has occurred between two image frames, the motion picture clip boundary can be drawn at a prescribed location between these two image frames, such as immediately after the earlier image frame, exactly in between the two image frames, or immediately before the later image frame.

E6. Variation 6:

The monitoring robot may comprise a robot having any desired configuration or functions. For example, a pet robot having the configuration of an animal may be used. Furthermore, the image processing apparatus may comprise something other than a robot. In addition, the image processing apparatus that executes clipping processing need not comprise a robot, and any other desired type of apparatus may be used.

What is claimed is:

1. An image transmission apparatus for transmitting multiple image frames, comprising:
   an outline extraction processor configured, based on image data representing a plurality of image frames, to extract an outline of a specific-type image element in each of the image frames and to create outline data for each of the image frames;
   a selector configured to select selected data for each of the image frames, the selected data for each image frame being either the image data representing said image frame or the outline data created for said image frame; and
   a transmission module configured to transmit the selected data for each image frame to an external receiving device,
   wherein the selector determines, for each image frame, whether a scene change has occurred or not, selects the image data representing said image frame if a scene change has occurred, and selects the outline data created for said image frame if a scene change has not occurred; and
   wherein the selector determines, for each image frame, whether a scene change has occurred or not based on a change in a direction of an outline vector indicating a direction of an outline in said image frame.

2. An image transmission/receipt system for transmitting and receiving multiple image frames, comprising:
   the image transmission apparatus according to claim 1; and
   an image receiving apparatus for receiving the selected data for each image frame from the image transmission apparatus and for reproducing images from the received selected data,
   wherein:
   the image receiving apparatus comprises an image reconstruction module configured to reconstruct image frames from the received selected data,
   (i) when the received selected data for an image frame is image data, the image reconstruction module creates a reproduced image frame based on the image data, and
   (ii) when the received selected data for an image frame is outline data, the image reconstruction module creates a reproduced image frame by determining pixel values in the outline data by executing rendering within an outline expressed by the outline data.

3. A method for transmitting multiple image frames to an external receiving apparatus, comprising the steps of:
   (a) extracting, based on image data representing a plurality of image frames, an outline of a specific-type image element in each of the image frames and creating outline data for each of the image frames;
   (b) selecting selected data for each of the image frames, the selected data for each image frame being either the image data representing said image frame or the outline data created for said image frame; and
   (c) transmitting the selected data for each image frame to an external receiving device,
   wherein step (b) further comprises determining, for each image frame, whether a scene change has occurred or not, selecting the image data representing said image frame if a scene change has occurred, and selecting the outline data created for said image frame if a scene change has not occurred; and
   wherein whether a scene change has occurred or not is determined, for each image frame, based on a change in a direction of an outline vector indicating a direction of an outline in said image frame.

4. An image processing apparatus for dividing a motion picture into multiple motion picture clips, comprising:
- an outline extraction processor configured to extract an outline of a specific-type image element in each of a plurality of image frames of the motion picture and to create outline data, based on image data representing the image frames of the motion picture;
- a scene change determination module configured to determine that a scene change has occurred between two image frames when an amount of change between the outlines extracted from the two image frames exceeds a prescribed threshold value; and
- a clipping processor configured to create clipped motion picture data representing multiple motion picture clips which are obtained by dividing the motion picture between two image frames when a determination that a scene change has occurred between the two image frames is made.

5. The image processing apparatus according to claim 4, wherein
the scene change determination module uses, as the amount of change between the outlines, an amount of change in directions of outline direction vectors indicating directions of the outlines.

6. The image processing apparatus according to claim 4, wherein
the specific-type image element is a face region of a person and the clipping processor describes, in the clipped motion picture data, information identifying an image frame that includes a front of a face.

7. The image processing apparatus according to claim 4, wherein
the scene change determination module determines whether or not a scene change has occurred using prescribed parameters other than the amount of change between the outlines, in addition to the amount of change between the outlines.

* * * * *